July 27, 1965

L. A. OHLINGER 3,197,377

REACTOR MONITORING MEANS

Filed May 24, 1946

Witnesses:

Inventor:
Leo A. Ohlinger
By: Robert A. Lavender
Attorney.

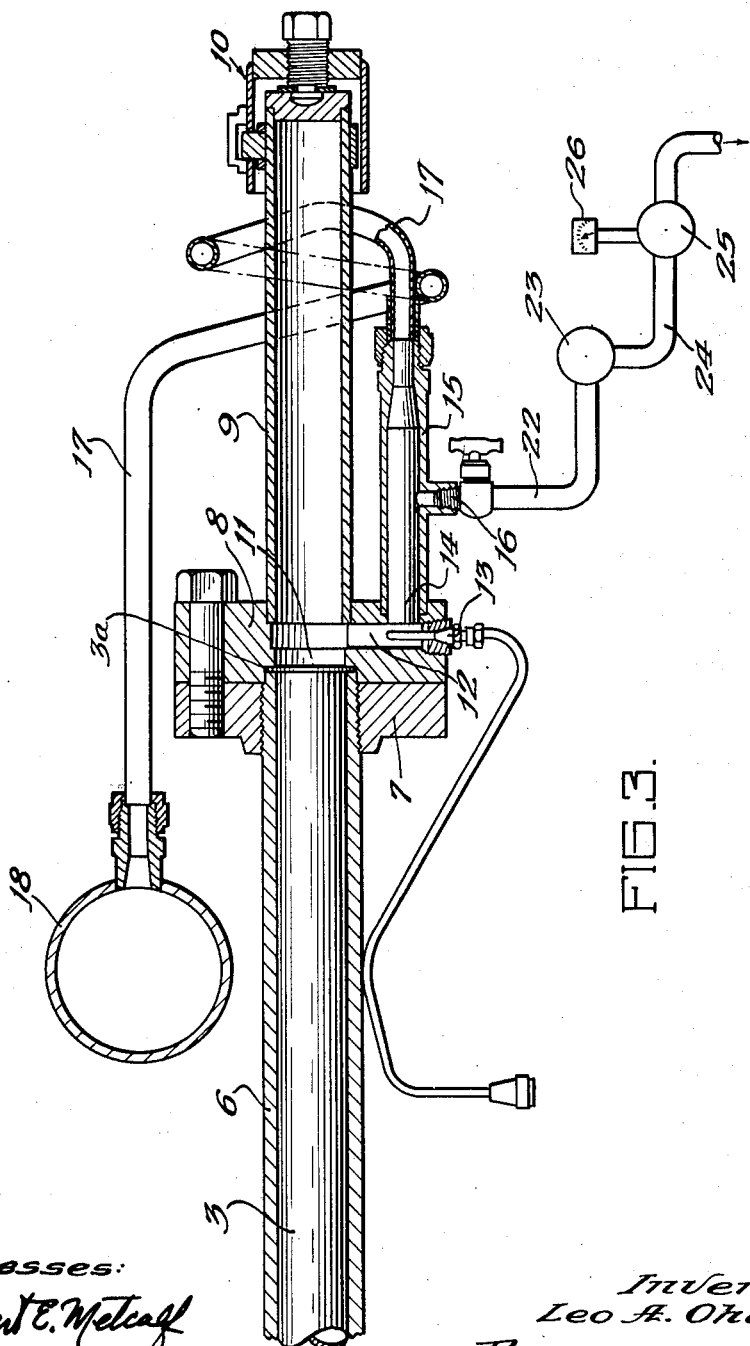

July 27, 1965 L. A. OHLINGER 3,197,377
REACTOR MONITORING MEANS
Filed May 24, 1946 3 Sheets-Sheet 3
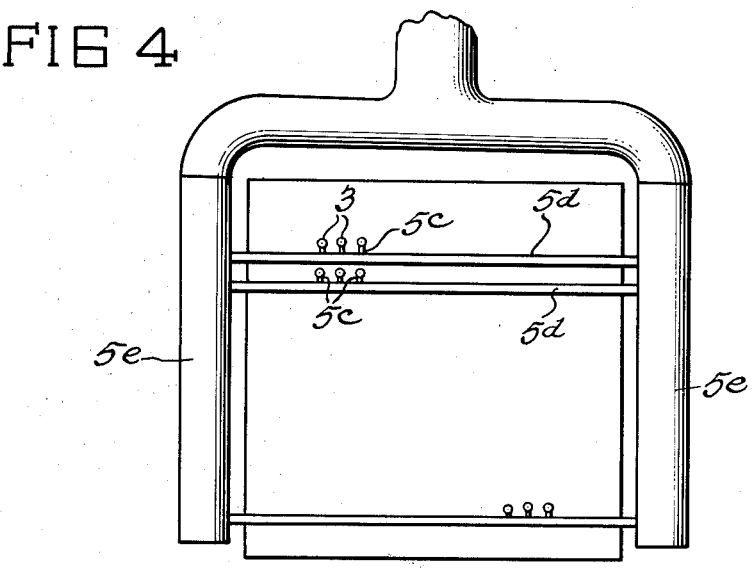
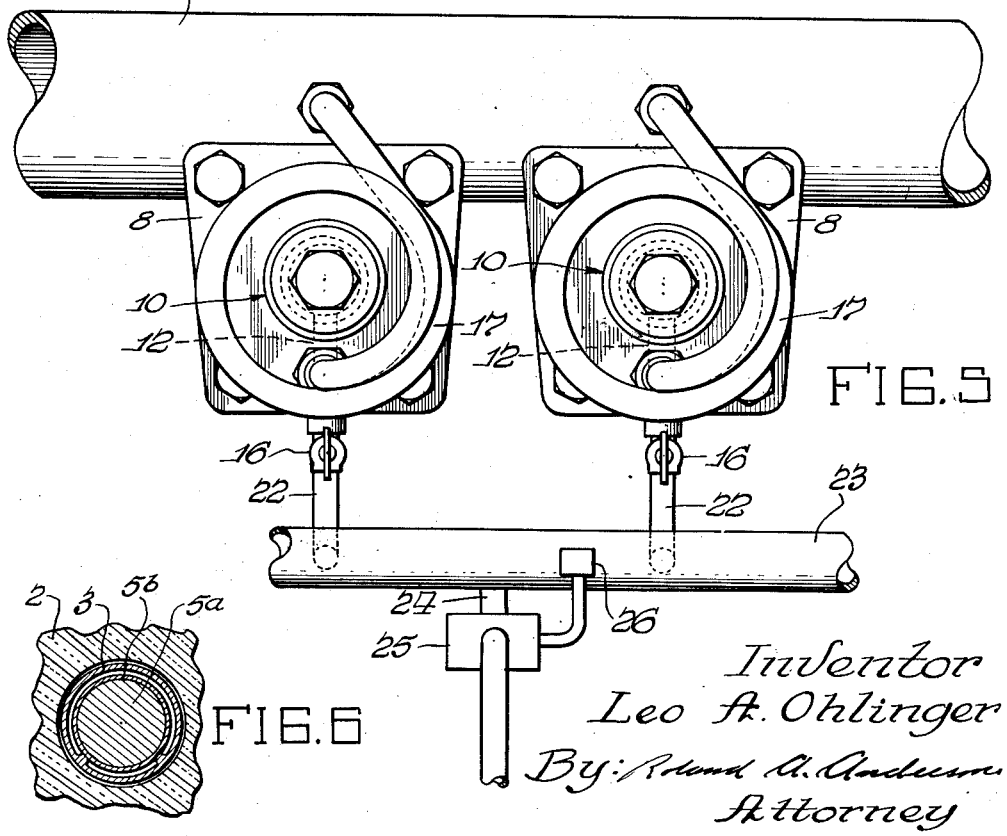
Inventor
Leo A. Ohlinger
By: Roland A. Anderson
Attorney

3,197,377
REACTOR MONITORING MEANS

Leo A. Ohlinger, Chicago, Ill., assignor to the United States of America as represented by the United States Atomic Energy Commission
Filed May 24, 1946, Ser. No. 672,116
1 Claim. (Cl. 176—19)

This invention relates to neutronic reactors and particularly to a method and apparatus for detecting changes which occur in the normal operating conditions thereof promptly upon their occurrence.

For the purpose of illustration, an embodiment of the present invention is disclosed herein as applied to a neutronic reactor of the general type described in Fermi et al. Patent 2,708,656, dated May 17, 1955, in which aluminum jacketed bodies of uranium are contained in thin walled aluminum tubes through which cooling fluid is circulated continuously, passing in contact with the jacketed bodies, the tubes being disposed in a mass of graphite which serves as a moderator.

The principal object of the present invention is to detect sudden changes, or radical departures from normal, in the radioactivity of a reactor immediately upon their occurrence regardless of their type or origin so that as much time as possible is afforded for investigation as to the causes of the change or departure, and for corrective steps, whereby possible injury to personnel and damage to the reactor can be reduced to a minimum.

Another object is to provide a relatively direct method and simple apparatus for detection of sudden changes in the operation of a reactor.

Other objects and advantages will become apparent from the following description wherein reference is made to the drawings, in which:

FIG. 3 is an enlarged longitudinal sectional view of one of the cooling tubes of the said reactor with the present invention installed for use in connection therewith;

FIG. 4 is a diagrammatic elevation of the charging face of the reactor;

FIG. 5 is a fragmentary elevational view of a portion of the rear face of the reactor; and FIG. 6 is a fragmentary sectional view through the reactor showing a jacketed uranium rod in a coolant tube.

Figure 1:
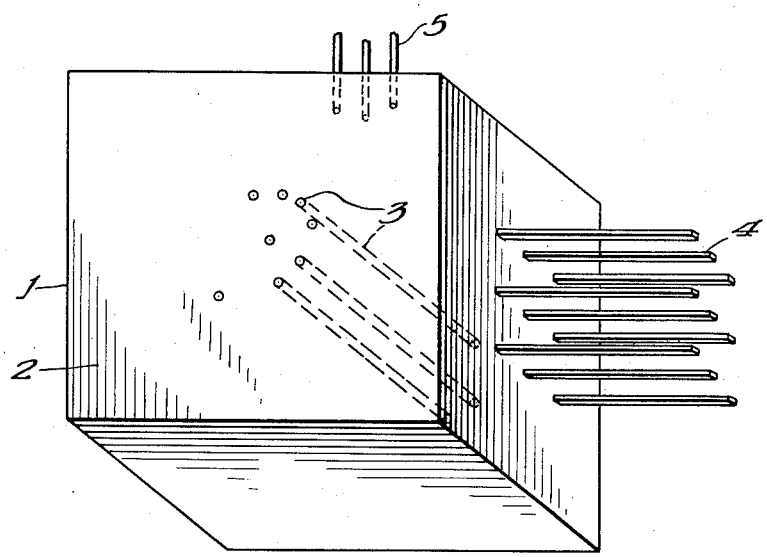
FIG. 1 is a diagrammatic perspective view of a reactor.

In neutronic reactors of the general type illustrated, there are several conditions which may arise which, if not discovered and remedied promptly, would endanger personnel, damage the reactor, or, necessitate difficult servicing operations or repairs. As one example, if water should enter the jacket which encloses one of the uranium bodies because of corrosion or damage to the jacket, the uranium body would swell due to the resultant formation of uranium compounds and this swelling, if permitted to continue, might eventually greatly restrict or stop the flow of coolant water through the associated cooling tube. Such restriction or stoppage may result in steaming in the tube decreasing the local density of the water. A decrease in water density causes a decrease in neutron absorption and a corresponding local increase in neutron flux and heat generated. The excess heat and neutrons may be transferred to adjacent tubes causing local boiling and increased heat and neutron generation. This condition and its progressive spread is the so-called "boiling" disease which presents very definite hazards. Again, the swelled body might stick in the tube so tightly that removal would be difficult and often possible only by removing the tube itself. Such operations are time consuming and laborious, and may even be impossible.

As another example, corrosion of the tubes, if not promptly discovered and remedied, can leak coolant into the surrounding moderator with deleterious effects on the operation of the reactor.

Also, the coolant water itself can present a hazard to personnel, and to the public if discharged to publicly accessible places, if it becomes contaminated by fission products above the maximum for which safety precautions have been taken. This contamination would occur when a jacket on one of the uranium bodies would become corroded through or damaged enough to expose the uranium or allow coolant to get into and out of the jacket carrying therewith corroded active material.

Finally, because of the tremendous potential power production of a reactor which becomes effective almost instantaneously if it is not fully controlled, and because of possible dangerous effects which may result from causes unknown, it is highly desirable that there be a prompt warning generally of any sudden or radical change in the conditions known to be consistent with normal and expected operation. Since, as mentioned, the cause of the change may be one never before encountered, distinct advantages would result from monitoring broadly for indications generally of departures from the normal regardless of what the cause may be instead of monitoring for indications of specific changes which have been theoretically determined as possible from conceivable causes and therefore are limited to possibilities foreseen.

In order to detect failures in the cooling tubes or in the jackets surrounding the uranium bodies in the reactor it is desirable to utilize some detecting device that can signal this failure as soon after it occurs as possible. Thus the detector must be associated as closely as possible with the source of the trouble.

The material most intimately associated with the portions of the reactor where these failures will occur and yet is available for monitoring promptly outside of the reactor after its association with the point of trouble is the discharge cooling water or fluid which is passed continuously through the tubes, over the bodies and out of the reactor to an accessible location. The coolant fluid can be handled conveniently so as to reflect a change in cooling tubes as a group or in a single tube, selectively, so that the number of points of observation necessary for general routine monitoring is very limited and continuous prompt general monitoring is possible, whereas the continuous monitoring of each of a large number of specific tubes would require so much time or equipment that discovery of a change might be considerably delayed. Also, the cooling water, while subject to monitoring in bulk as a general procedure for large general portions of the reactor can be subdivided easily and quickly into groups in accordance with more limited portions of the reactor and finally limited to specific tubes when an indication of change has occurred in the larger portion of which the specific tube is a part. Having been warned that a change has occurred and having taken steps immediately to trace the change to a specific tube, further monitoring of the tube for the determination of the specific type of change can be accomplished without undue delay.

Thus, promptness in knowledge of the existence of some change and its extent throughout the reactor, in steps to determine the specific location of the change and in determining the specific nature of the change and the possible remedy so that immediate steps to remove the cause may be taken, are direct results of the present invention, and, in a reactor in which increases in power are exponential if not controlled, the time element is of the most extreme importance.

Broadly, therefore, the present invention comprises monitoring the discharge cooling fluid of water of a reactor immediately after it has contacted the jacketed bodies of metal for detecting sudden or radical changes in the radiations or ionization in the the fluid, which changes are the immediate reflections of one or more changed conditions in the operation of the reactor which may prove hazardous to personnel or dangerous to the reactor structure if not located and remedied promptly.

The drawings illustrate a reactor 1, such as shown and described in the above mentioned Evans' application, which comprises essentially a shielded mass 2 of graphitic moderator material through which thin walled aluminum coolant tubes 3 extend from the charging face at the front to the discharge face at the rear. Control of operation is effected by control rods 4 of neutron absorbing material which are insertable into and withdrawable from the moderator mass 2 from a lateral face. For emergency shut down, vertical drop safety rods 5 of neutron absorbing material are provided and are arranged to be dropped into suitable wells in the mass 2. The tubes 3 are charged with uranium rods or rod segments 5a which, as shown in FIG. 6, are contained in sealed aluminum jackets 5b and fit in the tubes 3 with radial clearance so as to afford annular passages for coolant fluid, such as water, through the tubes in contact with the jacketed rods.

The tubes 3 are arranged in horizontal rows spaced apart vertically and form a regular geometric design.

As shown in FIG. 4, cooling water is supplied at the charging face of the reactor continuously into inlets 5c of the tubes 3 which in one operating reactor number about two thousand, and is continuously discharged from the tubes 3 at the discharge face. The inlets 5c are fed by manifolds 5d, which are in turn fed by supply pipes 5e.

Since the illustrative example of the present invention is located at and cooperates with the tubes 3 at the discharge face of the reactor, only the cooling water discharge system need be described in any detail.

Figure 2:
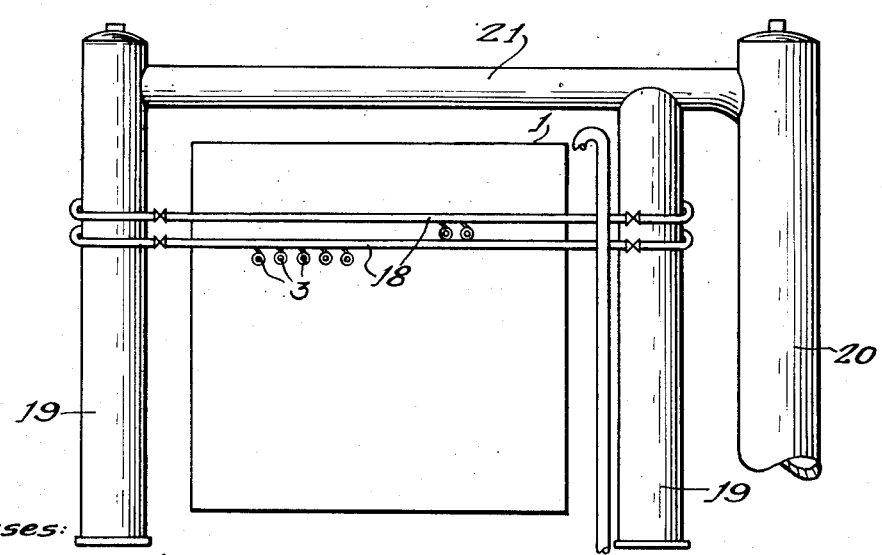
FIG. 2 is a diagrammatic elevation of the discharge face of the reactor illustrated in FIG. 1.

Referring to FIGS. 2 and 3, each aluminum tube 3 is provided with a heavy sleeve 6 at its discharge end on which is secured a flange 7. The end of tube 3 is then flared over the end of sleeve 6 as at 3a. A companion flange 8 is secured to the flange 7 and seals the end of the tube 3 circumferentially. The flange 8 carries a tubular discharge extension 9 which is sealed at the end by a cap 10 which is removable for discharging the rods of metal from the tube 3. The flange 8 has an axial passage 11 which is coaxial with and connects the passages of the tube 3 and extension 9, and has a radial bore 12 in which is installed a thermocouple 13. The flange 8 also has a longitudinal bore 14 which communicates with the bore 12 and with a T-fitting 15. The fitting 15 is connected to a needle valve 16 and to a flexible pipe 17 which leads into a horizontal discharge manifold 18 through which coolant water normally is discharged from the tube 3.

As illustrated in FIG. 2 one horizontal discharge manifold 18 is provided for each horizontal row of tubes 3. Each manifold 18 is connected at its ends to standpipes 19 which overflow into a common downspout 20, the standpipes 19 being connected at the top by a horizontal header 21.

Referring again to FIG. 3, the needle valve 16 is used as a convenient takeoff point for the detecting apparatus of the present invention inasmuch as in the direction of flow of coolant it is entirely beyond the rods of uranium in associated tube 3 and can be operated when desired so as to prevent accumulations of fissionable products therein.

Since monitoring of each tube would require large amounts of equipment and would necessitate much more work and observation, the discharge sides of the needle valves 16 of a number of tubes 3 are connected by pipes 22 to a common collecting header 23 which, in turn, is connected by a pipe 24 to a counter 25 and drains to a suitable storage from which the coolant can be discharged to waste, or to a reservoir for recirculation if so desired. The counter is connected electrically to a suitable recorder 26 and may be of a type for counting a specific type of radiation, but preferably is a gross radiation counter which is responsive to a large number of types of radiation and is operated by all or any of them instead of being selective.

Any number of tubes 3 may be connected to a single collecting header 23 as convenience may dictate and each tube 3, by means of its valve 16, can be isolated when desired. Thus, so long as normal conditions in all tubes of the group connected to a given collecting header 23 are maintained, there is no need for monitoring such tubes individually. However, upon a sudden increase in gross radioactivity or radiation of any nature in a given header, each tube associated with the particular header can be isolated for individual testing.

The present invention, when utilizing a gross radiation counter 25, has certain distinct advantages. Such a counter is not affected by delayed neutron backgrounds and the like and is more reliable in indicating generally that a change has occured in any one or more of a number of types of radiation without selection and any increase indicated by it is probably due to a change in some fundamental condition in the reactor. Furthermore, the response is immediate and is not dependent upon the buildup of an undesirable condition to an appreciably high level.

Such a gross radioactivity or radiation counter may be responsive to fission products, neutrons, foreign matter introduced with the cooling water and which carry alpha, beta, and gamma radiations, but is not selective. Thus a single counter is adequate to warn immediately that a change in an undetermined one or more of a large number of conditions has occurred, even when the change is relatively small.

For example, corrosion of a jacket would cause an indication of change long before it has progressed to the point where leakage of the jacket occurred so that investigation as to the cause of the indication could be made before the change had progressed to an appreciable or dangerous degree.

Furthermore indications might be made of new conditions not theretofore contemplated. As an actual example of the latter in an operating reactor, the present method disclosed a sudden increase of 50 percent in gross radioactivity. This sudden and alarming increase obviously would not be apt to be due to such contemplated possibilities as deterioration of rod segment jackets and the like. It was too sudden and too general, appearing in numerous headers simultaneously. With such a warning, the reactor was shut down immediately, thus safeguarding personnel and the structure. Investigation followed and disclosed that the cooling water had become contaminated with manganese in the purification plant prior to its delivery into the reactor. This prompt discovery and removal of the cause forestalled the discharge of great quantities of highly contaminated water from the reactor with its consequent dangers to operating personnel and to the public. Other monitoring provided for detecting changes due to specific foreseeable or probable causes did not detect changes resulting from such an improbable and unforeseen occurrence.

It is apparent, therefore, that the monitoring of the discharge cooling fluid immediately after its passage over and in contact with the metal bodies which are being subjected to nuclear bombardment in a reactor for changes in radioactivity has many distinct advantages, and is highly effective for its intended purposes.

While the present invention has been described as using a gross radioactivity counter, obviously, if the monitoring of the reactor for a less general range of conditions is desired, the present invention may be readily applied thereto by providing a counter responsive to the predetermined radioactive effects reflected in the discharge cooling and due to particular preselected conditions.

In the form illustrated, the radiation detecting apparatus is normally not included in the cooling system so that fission products have little chance to accumulate or deposit and produce erroneous operation of the detecting apparatus. Instead, it is located at a remote well shielded place devoid of activity other than that of the coolant.

If desired for more general initial monitoring, several collection headers may be connected normally to a larger common header, valves being provided for each collection header for isolating all or any part of the collection headers from the larger common header. In this manner the number of routine observations and the amount of counting equipment required can be reduced.

Modifications in the present disclosed novel method of detecting changes in neutronic reactors will be apparent to those skilled in the art, and such modifications are contemplated as within the scope of the invention.

What is claimed is:

In a neutronic reactor, a plurality of tubes having inlet ends and outlet ends, a discharge manifold connected to the outlet ends of the tubes, bodies of fissionable material disposed in the tubes, means supplying fluid coolant to the inlet ends of the tubes, a header, a plurality of pipes connecting the outlet ends of the tubes to the header independently of the manifold, means connected with the header for measuring the radioactivity of the fluid coolant, and a plurality of valves associated with the pipes for providing for the flow of coolant from all of the tubes to the header and from one tube after another to the header, each pipe being provided with one of the aforesaid valves.

References Cited by the Examiner

UNITED STATES PATENTS

| 1,662,429 | 3/28 | Lowy | 250—83.6 |
| 2,315,223 | 3/43 | Riche | 73—53 X |
| 2,346,043 | 4/44 | Mysels | 250—106 |
| 2,408,230 | 9/46 | Shoupp | 250—83.6 |
| 2,453,456 | 11/48 | Piety | 250—106 |
| 2,599,922 | 6/52 | Kanne | 250—83.6 |

FOREIGN PATENTS

| 114,150 | 5/40 | Australia. |
| 114,151 | 5/40 | Australia. |
| 233,011 | 10/44 | Switzerland. |

OTHER REFERENCES

Smyth, H. D., A General Account of the Development of Methods of Using Atomic Energy for Military Purposes, publ. by Supt. of Documents, Washington, D.C., August 1945, pages 75, 82–85, 177–180.

REUBEN EPSTEIN, *Primary Examiner.*

WILLIAM G. WILES, ARTHUR W. CROCKER, JAMES L. BREWRINK, *Examiners.*